Dec. 14, 1937.   A. W. KNISLEY   2,101,858
STATIC TUBE SLEEVE
Filed July 30, 1936
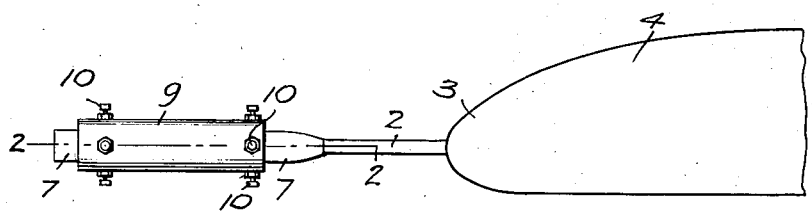
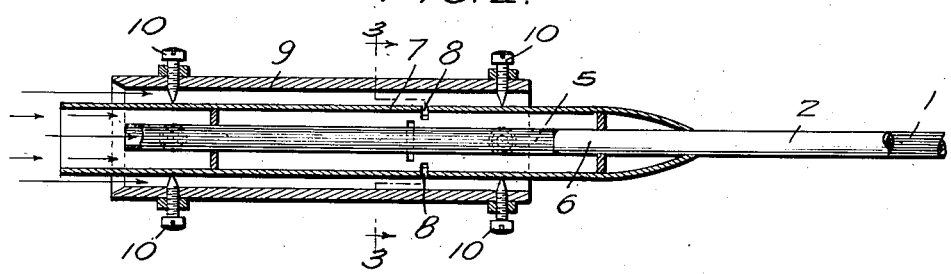
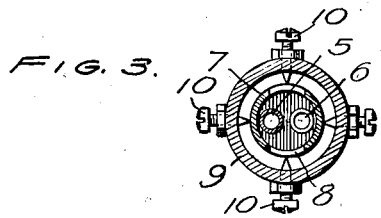
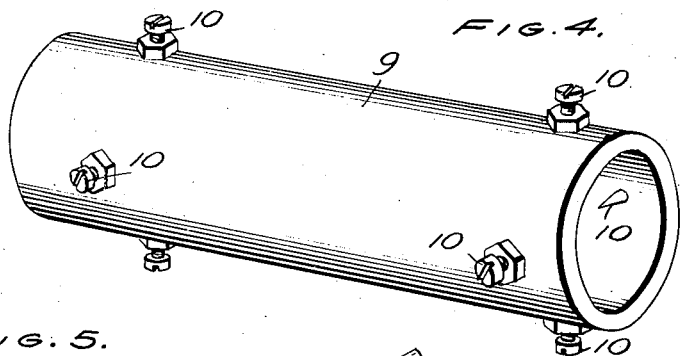
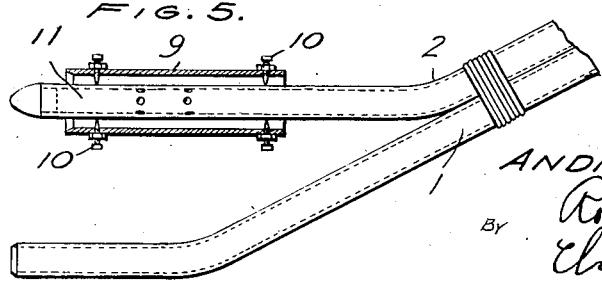
INVENTOR
ANDREW W. KNISLEY
BY Robert V. Laughlin
and Clade Koontz
ATTORNEYS Patented Dec. 14, 1937

2,101,858

UNITED STATES PATENT OFFICE 2,101,858

STATIC TUBE SLEEVE

Andrew W. Knisley, Dayton, Ohio

Application July 30, 1936, Serial No. 93,463

5 Claims. (Cl. 73—2)

(Granted under the act of March 3, 1883, as amended April 30, 1928; 370 O. G. 757)

The invention described herein may be manufactured and used by or for the Government for governmental purposes, without the payment to me of any royalty thereon.

This invention has reference to pressure tubes of the Pitot-static type, such as are used on aircraft in connection with an indicator for obtaining an indication of the speed of the airplane relative to the air through which it is moving.

In the installation of aircraft navigational instruments, such as air-speed indicators, the approved location of the Pitot-static tube assembly (hereinafter referred to as the airspeed head) varies somewhat for different types of airplanes, but in general is approximately 36 inches forward of the leading edge of a wing; this location being determined by reason of the fact that, with the airspeed head at shorter distances near the leading edge of the wing, a straight flow of air past the holes of the static tube and a correct indication of airspeed cannot be obtained because of pressures and disturbances in the vicinity of the leading edge of the wing.

By reason of its lengthy jutting position ahead of the wing, the airspeed head is, however, obstructively located when the airplane is on the ground and, being in the way of inspectors and mechanics, hinders and impedes inspection and repairs in the field. The supporting tube of the airspeed head accidentally may be bent from its true position and, in attempting to straighten the tube, the airspeed head is not always returned to alignment with the normal thrust line.

It is an object of the present invention to overcome the disadvantages above enumerated by the provision of means permitting the use of a shortened airspeed head near the leading edge of the wing, as close as 13 inches and at the same time obtaining a correct indication of airspeed despite the fact that the airspeed head is in a location where disturbances ordinarily prevent even an approximately correct indication.

With the above in view, the invention resides in the novel arrangement, combination, and design of parts hereinafter more specifically described and pointed out in connection with the accompanying drawing, wherein:

Figure 1 is a view illustrating the application of the invention to a Pitot-static tube of one conventional type;

Figure 2 is a section taken on line 2—2 of Figure 1;

Figure 3 is a section taken on line 3—3 of Figure 2;

Figure 4 is a view, in perspective, of the static tube sleeve of the invention, and Figure 5 is a view illustrating the invention applied to another conventional type of Pitot-static tube.

In a Pitot-static tube installation illustrated in Figures 1 to 4, inclusive, the Pitot tube 1 and the static tube 2 extend outwardly and forwardly of the leading edge 3 of the wing 4 with their respective outer ends 5 and 6 supported within a tube 7; the latter having air holes or slots 8 in the rear or static unit end. This structure and installation is conventional except for the fact that the distance from the leading edge of the wing to the outer end of the supporting tube 7 is shortened appreciably contrary to accepted practice, being approximately 13 inches more or less instead of 36 inches forward of the leading edge. In order that correct indications of airspeed may be obtained with the airspeed head in this heretofore undesirably close position near the leading edge of the wing, it is necessary that the air be made to flow parallel with the tube 7 and past the static openings 8 therein. The means whereby this is accomplished constitutes an important and essential feature of the present invention and consists mainly in a tubular sleeve 9 inserted over the static unit tube 7 and equipped at each end with a series of fastening-and-centering set screws 10 by means of which it is fastened to and centered about the tube 7, as shown in Figures 2 to 4, inclusive. The dimensional characteristics of this sleeve are preferably such as to allow a cylinder of air, ¼th inch inside diameter and ⅜th inch outside diameter, to pass through the opening between the static tube and the sleeve; the space on every side being 1⁄16th inch. Hence, the sleeve maintains a straight flow of air past the static openings and permits the use of the airspeed head in more desirable locations near the leading edge of a wing heretofore impossible for the reasons herein disclosed.

In a Pitot-static tube assembly of the type shown in Figure 5, where the coupled Pitot tube 1 and the static tube 2 diverge at their forward ends, the sleeve 9 surrounds the static tube end 11. The sleeve used in this installation is identical in structure to but considerably smaller than the sleeve used in the previously described installations; the difference being occasioned by the fact that in the first instance the static tube sleeve 9 surrounds both the Pitot-tube and the static tube and in the second instance it surrounds only the static tube.

Having thus described the invention, I claim—

1. In an airspeed head of the Pitot-static tube type including a static tube having a closed end and a static opening in its side wall, an open ended air conduit along the outer surface of the static tube and extending over the static opening, said conduit being dimensioned to conduct a layer of air in a straight flow close to and parallel with the outer surface of the static tube and across the static opening.

2. In a Pitot-static tube assembly including a static tube having a closed end and circumferentially spaced static openings in its side wall, a tubular member axially centered about the static tube in fixed closely spaced relation to the side wall of the tube to allow a cylinder of air to pass through the space between the tubular member and the side wall of the static tube and across the static openings.

3. An attachment for a Pitot-static tube assembly including an elongated static tube having a closed end and a static opening in its side wall which comprises a tubular sleeve dimensioned for insertion over the static tube of the assembly in spaced relation to its side wall to provide an intervening space for the flow of air between the static tube and the sleeve, and a series of adjustable set screws at each end of the said sleeve for centering the latter about the static tube.

4. In a Pitot-static tube installation for aircraft, the combination of a wing, an airspeed head suitably mounted on the aircraft and projecting forwardly of the leading edge of the wing, said airspeed head including a static tube having a closed end and a static opening in its side wall and said static tube being arranged with its axis parallel to the line of flight of the aircraft and with its closed end directed forwardly and being located within a zone of pressure and disturbances resulting from ordinary flight of the aircraft immediately forward of the leading edge, and air flow straightening means surrounding the static tube in spaced relation to its side wall for providing a straight flow of air past the static opening of the static tube.

5. In a Pitot-static tube installation for aircraft, the combination of a wing, an airspeed head suitably mounted on the aircraft and including a static tube having a closed end and a static opening in its side wall, said tube being disposed near the leading edge of the wing with its axis parallel to the line of flight of the aircraft and with its closed end directed forwardly and being located within a zone of pressure and disturbances where the flow of air during flight is other than parallel with the static tube, and air flow straightening means surrounding the static tube in spaced relation to its side wall for intercepting and diverting part of the air in the disturbed zone in a straight flow through the space between the side wall of the static tube and the said air flow straightening means and parallel with the static tube.

ANDREW W. KNISLEY.